(12) United States Patent
Boutcher et al.

(10) Patent No.: US 9,106,731 B1
(45) Date of Patent: Aug. 11, 2015

(54) IDENTIFYING RECORDED CALL DATA SEGMENTS OF INTEREST

(71) Applicant: West Corporation, Omaha, NE (US)

(72) Inventors: James K. Boutcher, Omaha, NE (US); David Scheet, Omaha, NE (US); Jeffrey William Cordell, Omaha, NE (US)

(73) Assignee: West Corporation, Omaha, NE (US)

( * ) Notice: Subject to any disclaimer, the term of this patent is extended or adjusted under 35 U.S.C. 154(b) by 0 days.

(21) Appl. No.: 13/628,699

(22) Filed: Sep. 27, 2012

(51) Int. Cl.
*H04M 3/42* (2006.01)
*H04M 3/22* (2006.01)

(52) U.S. Cl.
CPC .................................. *H04M 3/2227* (2013.01)
USPC ................................................... 379/201.01

(58) Field of Classification Search
USPC .......................................... 379/67.1, 202.01
See application file for complete search history.

(56) References Cited

U.S. PATENT DOCUMENTS

| 7,542,902 | B2 | 6/2009 | Scahill et al. | |
|---|---|---|---|---|
| 7,602,900 | B1 * | 10/2009 | Croak et al. | 379/265.07 |
| 7,672,845 | B2 | 3/2010 | Beranek et al. | |
| 7,860,722 | B1 | 12/2010 | Chow | |
| 2004/0081295 | A1 * | 4/2004 | Brown et al. | 379/88.13 |
| 2008/0232575 | A1 | 9/2008 | Gumbula | |
| 2008/0300872 | A1 | 12/2008 | Basu et al. | |
| 2010/0179811 | A1 | 7/2010 | Gupta et al. | |
| 2010/0274796 | A1 | 10/2010 | Beauregard et al. | |
| 2011/0225013 | A1 * | 9/2011 | Chavez et al. | 705/7.18 |
| 2012/0296914 | A1 * | 11/2012 | Romanov et al. | 707/741 |
| 2012/0323575 | A1 | 12/2012 | Gibbon et al. | |
| 2013/0108029 | A1 * | 5/2013 | Blewett et al. | 379/67.1 |

* cited by examiner

*Primary Examiner* — Rasha Al Aubaidi

(57) ABSTRACT

A method and apparatus of processing a voice call are disclosed. One example method of operation may include recording at least a portion of a conference call and storing the portion of the conference call in memory. The method may also include processing the portion of the conference call to identify at least one segment of interest and adding the at least one segment of interest to an existing work order associated with a third party application. The method may further provide forwarding the at least one segment of interest to a third party computing device.

17 Claims, 9 Drawing Sheets

100

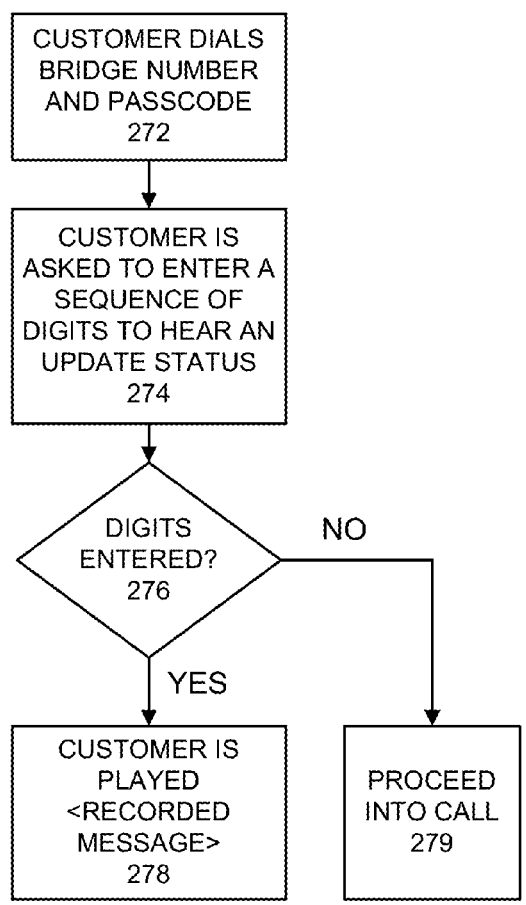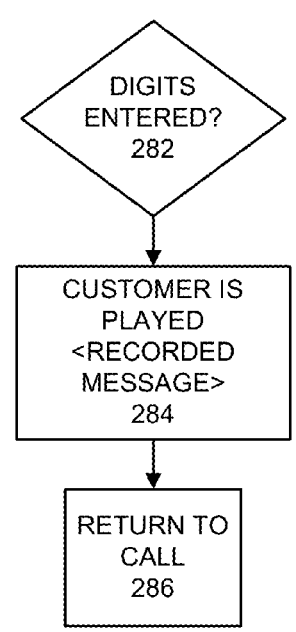
FIG. 2C
FIG. 2D

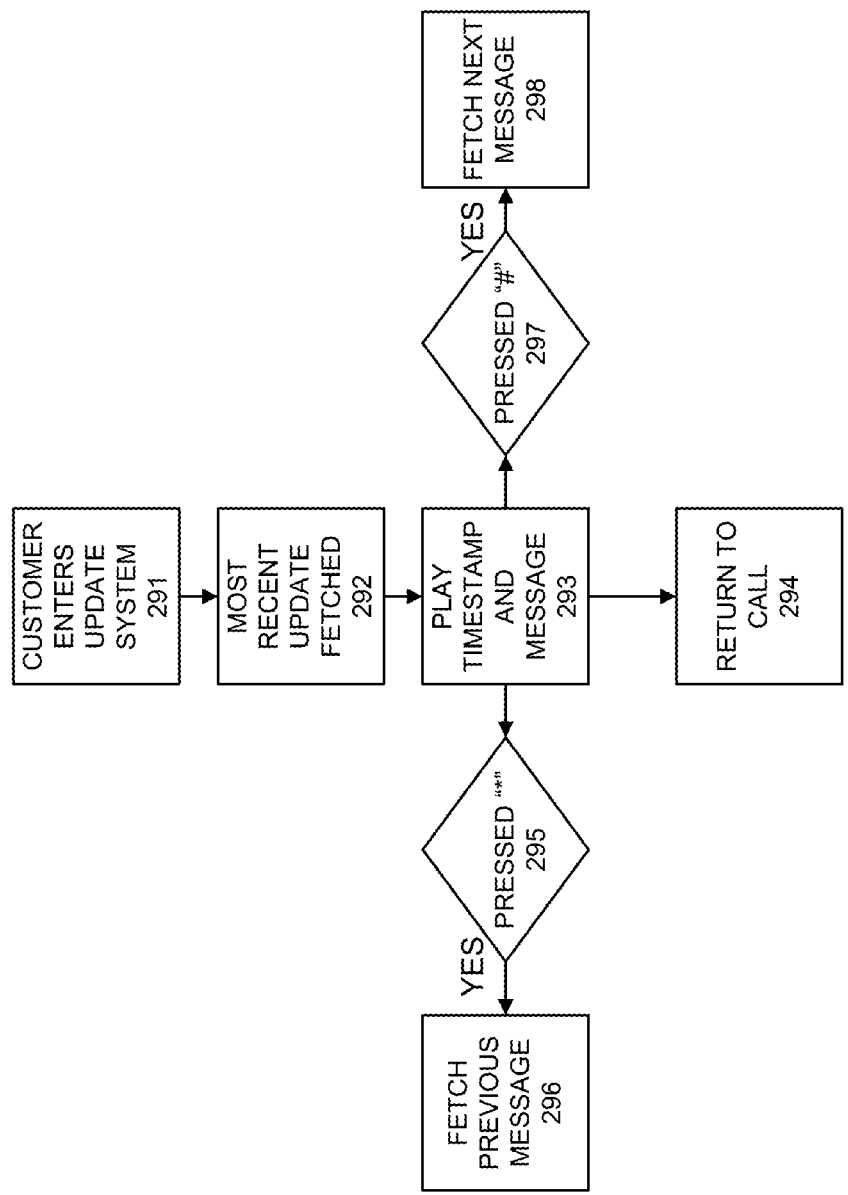

IDENTIFYING RECORDED CALL DATA SEGMENTS OF INTEREST

TECHNICAL FIELD OF THE INVENTION

This invention relates to recording call data and retrieving the recorded call data at a later time, and more particularly, providing the recorded call data to new call participants based on predetermined criteria.

BACKGROUND OF THE INVENTION

Conventionally, customer service phone calls, conference calls and other business related types of calls typically include more than one party participating during the call. In many instances, a third, fourth or even additional participants may join the call after a certain amount of time has elapsed. As a result, not every party to the call has been present since the beginning of the call. In turn, this call participant absenteeism naturally causes certain portions of the call to be missed by those parties who join an active call after a portion of the call has progressed.

SUMMARY OF THE INVENTION

One embodiment of the present invention may include a method that includes recording at least a portion of a conference call and storing the portion of the conference call in memory. The method may also include processing the portion of the conference call to identify at least one segment of interest and adding the at least one segment of interest to an existing work order associated with a third party application. The method may also include forwarding the at least one segment of interest to a third party computing device.

Another example embodiment of the present invention may provide an apparatus that includes a memory configured to store at least a portion of a conference call and a processor configured to process the portion of the conference call to identify at least one segment of interest, add the at least one segment of interest to an existing work order associated with a third party application. The apparatus may also include a transmitter configured to transmit the at least one segment of interest to a third party computing device.

BRIEF DESCRIPTION OF THE DRAWINGS

FIG. 2C illustrates an example flow diagram of a customer joining a conference call bridge and receiving pre-recorded call segments for a conference call.

FIG. 2D illustrates an example flow diagram of a customer already joined on a conference call bridge and receiving pre-recorded call segments for a conference call.

FIG. 2E illustrates another example flow diagram of a customer receiving pre-recorded call segments for a conference call.

DETAILED DESCRIPTION OF THE INVENTION

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

Example embodiments of the present invention provide a call recording function that permits new call participants who have recently joined a call to be informed about the events that happened during the call and prior to the new call participants being added to the current call. One example scenario according to example embodiments may be a customer service call that is conducted between a paying customer experiencing technical difficulties and a call center representative (see FIG. 1). Another example scenario according to example embodiments may include a conference call managed by a "leader", who is determining whether to record the conference call in-conference, and/or record an audio segment out-of-conference to be played to conference participants (see FIGS. 2A and 2B).

Figure 1:
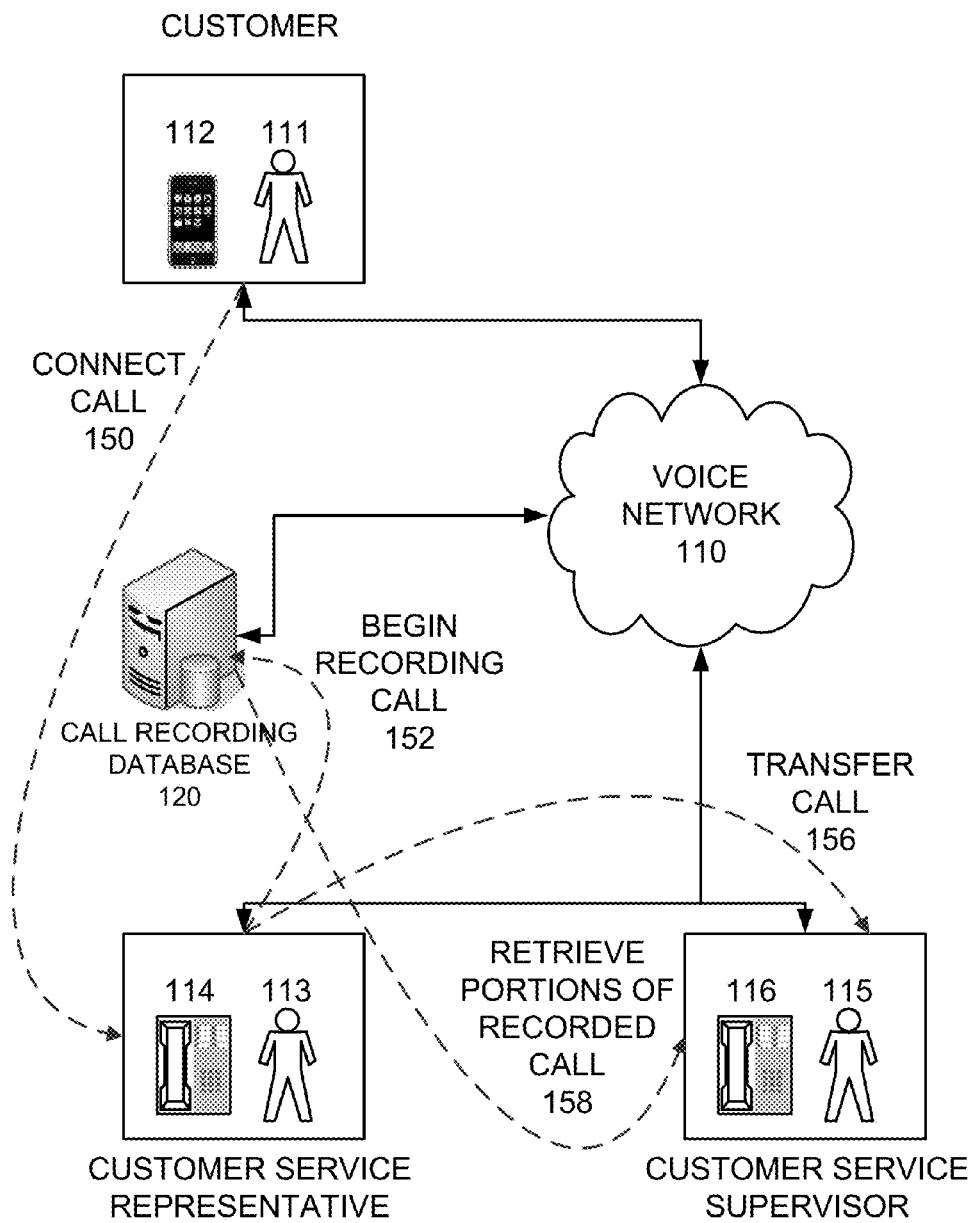
FIG. 1 illustrates an example communication network illustrating additional call participants being added to a call.

FIG. 1 illustrates an example communication network 100 including additional call participants being added to a call according to example embodiments. Referring to FIG. 1, a customer 111 may be operating a phone or mobile device 112 (i.e., smartphone) and may place a call to a business entity, such as a cable company to discuss a technical support matter. The call may be connected 150 to a first receiving agent or customer service representative 113 operating a phone 114 across a voice network (i.e., digital network (Internet), public switched telephone network (PSTN), private data network, etc.). The call may be recorded 152 and stored in a call recording database 120 for future reference.

While the call is being recorded, each second or periodic time unit of measurement (call segment "Tc") may be used as a time reference or timestamp for the call to provide indications of the call progress over time. The customer service representative 113 will assist the customer over the phone by providing detailed instructions for fixing the problem (i.e., computer problems, cable television box problems, Internet modem problems, etc.). However, at some point the customer service representative may have reached his or her capacity regarding knowledge in general about the outstanding problems being experienced by the customer 111. As a result, the representative may need to forward the call to a customer service supervisor phone 116 operated by a customer service supervisor 115 who can offer additional assistance. Unfortunately, up until this point in the call (i.e., 1 minute, 3 minutes, 10 minutes, etc.) the supervisor may not have heard the details regarding the present problem being experienced by the customer. Therefore, this supervisor may need to ask questions in an effort to understand the problem. The supervisor may be a new call participant who would benefit from certain portions of the call being automatically repeated since the supervisor has not heard the previous portions of the call.

The supervisor 115 may elect to hear certain portions of the call that were recorded and stored in memory at the database 120. The supervisor may request and/or automatically receive the call recorded segments at his or her phone 116. The call recorded segments may include a first 15 seconds of the call and the last 15 seconds of the call. The time frame of the recorded segments "Tc" provided to the supervisor may be shorter or longer depending on how the automated call segment retrieval process is setup. The specified portions of the call may be requested and the retrieved portions of the call may be provided to the supervisor 115 prior to the supervisor receiving the call transfer or contemporaneous with the call transfer.

According to example embodiments of the present invention, the supervisor may be able to quickly retrieve recorded portions of the call and listen to them prior to answering the phone during a call transfer operation. Various segments or portions of the call may be referenced to save time when attempting to share the purpose of the call with the recently added call participant.

According to another example embodiment, a parsing engine may be configured to parse certain keywords and their corresponding buffer areas (i.e., + or −10 seconds before and after the keyword is identified in the audio segment). The parsing engine may be operating on a computer or server operated by the new call participant's computing device (i.e., computer, smartphone, tablet computing device, etc.) or via the call database 120. The parser engine may be configured to parse keywords, such as "important" or "problem" that are spoken during the call. The customer service representative may be trained to speak those words during the call to provide a parse marker for the parsing engine at a later time. The parser may seek to discover multiple instances of the same word within a predefined time frame. For example, the customer service representative 113 may reiterate a known keyword to help the parser identify a key segment of audio in an otherwise long call. For instance, the customer service representative 113 may begin the call by identifying the problem experienced by the caller. Dialogue may be spoken by the representative, such as "so you're having a problem with your cable modem . . . that is the problem you're having correct?" The caller may agree "Yes" and the call has now introduced verbal markers that may be parsed at a later time by the parsing engine (not shown), which may be part of the call recording database 120 functionality.

Figure 2A:
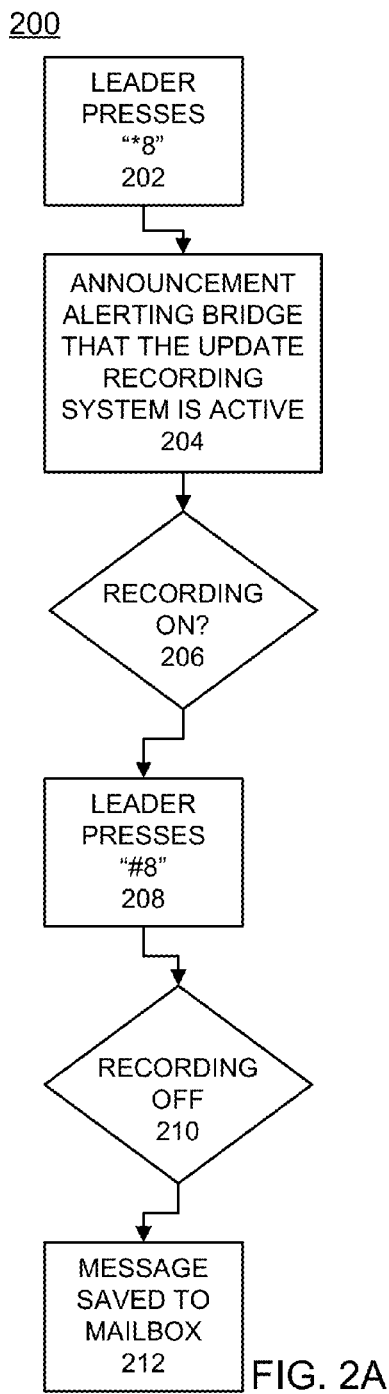
FIG. 2A illustrates an example flow diagram of an in-conference recording operation for a conference call.

According to another example embodiment, FIG. 2A illustrates a flow diagram of a conference call recording operation, according to example embodiments. Conference calls can be interrupted by new users joining or leaving an active call. As a result, there may be numerous updates being given to bring the new participants 'up-to-speed' with the current situation. Present call participants may find this to be disruptive and annoying. In turn, time is wasted in the present by trying to discuss the past discussions during a live call.

Figure 2B:
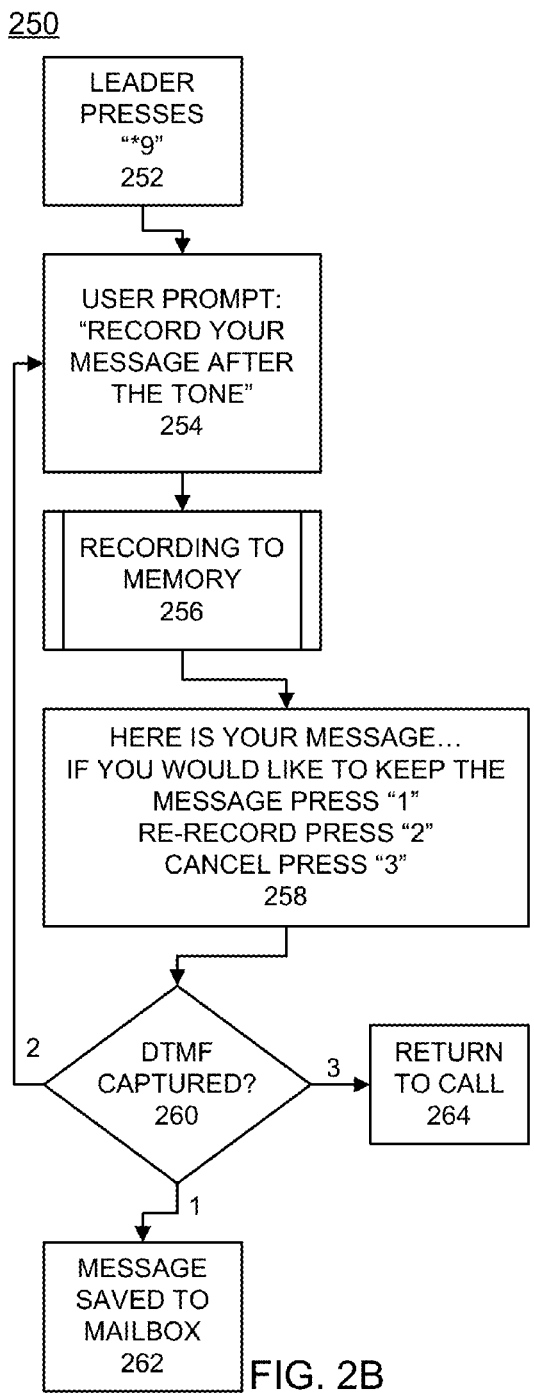
FIG. 2B illustrates an example flow diagram of an out-of-conference recording operation for a conference call.

A group leader or conference call manager may initiate a recording operation either in-conference (FIG. 2A) or out-of-conference (FIG. 2B). For example, by recording the "In Conference" or "Out of Conference" audio that new users could choose to hear prior to joining a call, the call data may be identified, recorded and saved for additional processing operations. Referring to FIG. 2A, the flow diagram 200 provides that the conference call leader may initiate an in-conference recording operation by pressing a predefined number via a dual tone modulation frequency (DTMF) interface (i.e., "*8") at operation 202. As a result, an announcement may be made to the conference members that a recording is about to take place at operation 204. The recording may begin by performing a recording determination at operation 206. The leader may stop the recording at any time by pressing another number combination "#8" at operation 208. A determination may be made as to whether the recording is now off at operation 210. Next, a message or flag may be used to mark the data message to indicate that the message should be saved in memory at operation 212. The message may include an audio segment identified by timestamps that indicate before, during and after the segment has ended. The audio segments may also be recorded autonomously by having a keyword identified as spoken by a leader or conference call moderator. An audio recording operation may also be invoked after a predetermined time has lapsed. For example, the leader may configure a recording to begin after five minutes has lapsed and knowingly not discuss important issues until such a time so as to be recorded. Also, the leader may speak a trigger word that when spoken is identified by a voice recognition module that triggers a recording operation (i.e., "important").

FIG. 2B illustrates an "out of conference" recording operation flow diagram 250 according to example embodiments. Referring to FIG. 2B, the leader may be part of a sub-conference and not actually participating in the conference call. The leader may select a pre-defined option (i.e., "*9") on the phone to begin a recording option over the computer or the phone. The recording application may prompt the leader to begin speaking after the tone at operation 254. The leader may record a message which is automatically stored in memory 256. The recording application may present the recording to the leader to determine whether he or she would like to accept it, reject it or record another message at operation 258. Once the recording is performed, the conference call attendees can continue to speak on the main conference call bridge, which depending on the elected options, could be heard by the leader while in the sub-conference. The leader would record a message and confirm the recording. Once they have saved the recording the leader may be automatically placed back into the main conference or exit if he or she has no more time. These options may be selected by the phone buttons via the dual tone modulation frequency (DTMF) keypad at operation 262. For example, option "1" may be to save the message, option "2" may be to re-record the message and option "3" may be to return to the call at operation 264.

In operation, when a conference call participant joins the call they can hear the most recent update by selecting a numerical option. This audio segment would be played prior to that participant joining the call to ensure they are brought up-to-speed with the conference call progress, especially what was missed prior to the participant joining the call. The call participant would also be able to press a key sequence while on the call to hear the most recently recorded update (s)/audio sequences. For those call participants that are already on the bridge desiring an update, the call recording application/system may listen or detect a brief period of silence to automatically begin playing the audio segment/update data.

FIG. 2C illustrates an example flow diagram of a conference call participant joining a bridge and receiving pre-recorded audio segments, according to example embodiments. Referring to FIG. 2C, the flow diagram 270 provides that a customer may dial a conference passcode and bridge number to enter a conference call at operation 272. The customer may be asked to enter a sequence of digits to hear an update status at operation 274. A determination is made as to whether the correct sequence was submitted by the customer at operation 276. If so, the customer is played a recorded message that was pre-stored in memory at operation 278. If not, the customer may still enter the conference call at operation 279.

FIG. 2D illustrates an example flow diagram 280 where a customer enters the correct digits, which is determined at operation 282. As a result, a pre-recorded message is played to the customer at operation 284. The customer is then automatically returned to the call at operation 286 once the audio segment(s) has ended.

FIG. 2E illustrates an example flow diagram of a customer listening to various different updates. Customers could also be offered the ability to hear previous status updates. In operation, a customer or conference participant could enter an update system at operation 290 by submitting login information or by entering a conference call. As a result, a most recent conference call update or recorded segment will be fetched from memory at operation 292 and played to the participant at operation 293 before returning the participant to the active call at operation 294. The message will be played according to its timestamp reference Tc1, Tc2, Tc3 ... Tcn. The participant may move forward or backward in time to hear the pertinent portions of interest. If the participant presses a key ("*" for example) at operation 295, the call would skip to the previous message segment at operation 296. If the participant presses another key ("#" for example) at operation 297 the call could skip to the next message segment at operation 298 (i.e., 10 seconds of recorded audio). Each message would be prefaced by a timestamp associated with its beginning.

According to another example embodiment, a leader may store a snippet of voice in an easy/on-demand playback storage location. In one example, for network troubleshooting bridges, "*12" could provide the latest known root cause and course of corrective action, along with an estimated time 'ET' to fix the problem. For a seminar series or a training call "*12" would provide the name and title of the main speaker. For FEMA-type emergency calls "*12" would provide the latest weather, hurricane update, or status of a missing child.

According to one example embodiment of the present invention, a customer call may be received at a customer service call processing center via a call representative 113 and a corresponding phone 114 that is operated by the call representative 113. In operation, the call is received, processed and forwarded to a call representative. Once a menu option is selected by the caller or a caller elects to receive technical support help from a technician, the call may be transferred to the technician. A similar procedure may take place by having a frustrated customer receive help from a leader or manager who provides additional support. In this example, the technician who was the second call participant and/or the leader who was the third call participant may need to listen to portions of the recorded call while the call is still in progress and while the customer is on hold prior to assisting the customer for increased efficiency.

Figure 3:
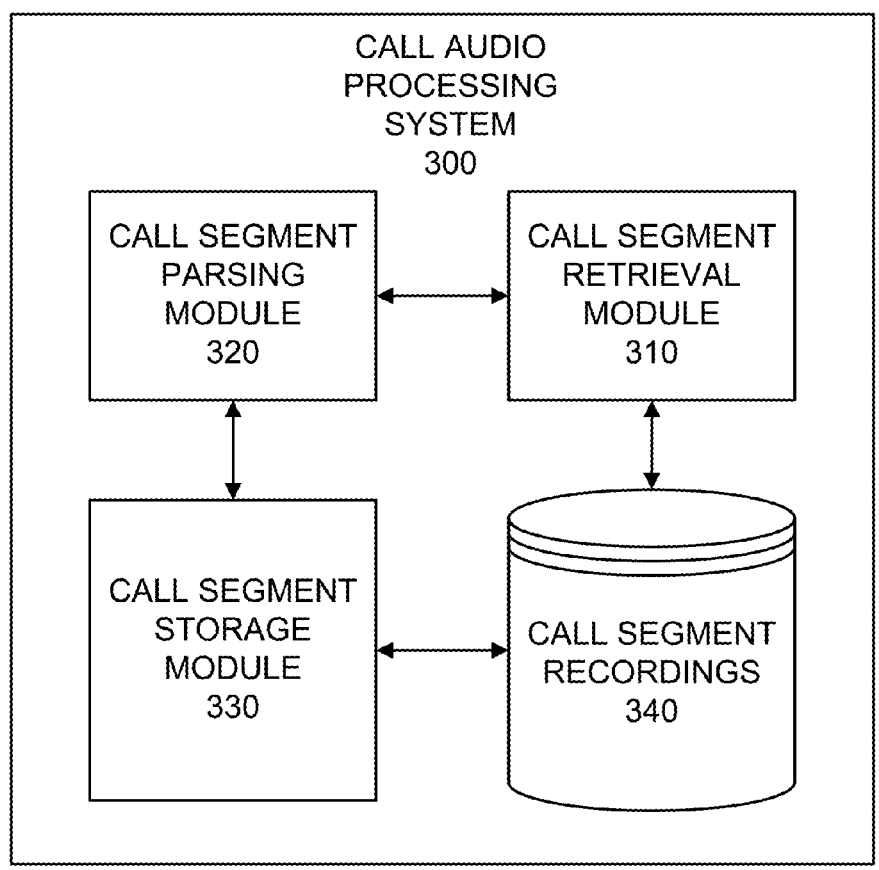
FIG. 3 illustrates an example call recording system configuration according to example embodiments.

FIG. 3 illustrates a call audio processing system 300. Referring to FIG. 3, once portions of the call between the customer and the call processing agent have taken place, those call segments 'Tc' may be stored in a call processing database of call segment recordings 340. A call segment retrieval module 310 may be used to retrieve those stored call segments responsive to a call transfer operation to a different agent (e.g., technician, manager, etc.). Each time the call is transferred portions of the call may be retrieved from memory and queued into a specified memory location which transfers those queued segments to the transferred party's call device responsive to transfer operation. For example, the queued call segments may include the first 10 seconds of the call, the last 10 seconds of the call prior to the transfer and/or any parsed segments that were parsed prior to the queuing operation so that the more important portions of the call are set in the queue and ready for transfer to the transferred party.

A call segment parsing module 320 may parse the extracted "important" or "problem" noted segments noted by time (i.e., time initial 'Ti', time important as designated by an 'important' word that was parsed 'Tm', time of a problem as designated by a 'problem'' word that was parsed 'Tp', etc.) of the previously recorded segments of the call and offer those segments to the transferred party "supervisor" before forwarding and connecting the call to the supervisor and transferring away the call from the customer support specialist, technician, etc., who offered the previous call support.

The parsing module 320 may parse the segments of the call that are deemed important for a preview and/or a shortened review (e.g., most important 30 seconds, keyword parsed segments, etc.). The parsing module 320 may access a list of keywords noted in a data file (i.e., comma separated values 'CSV' file or similar data file). The keywords may be compared to a voice transcription that was processed from a natural language processor from voice to text. The segments of the transcription that contain the data file keywords may be identified and a predetermined number of words both before and after the identified keywords (e.g., 10 words, 20 words, 30 words, etc.) may be identified as part of the key audio segments to be marked, stored and retrieved at a later time. The processed and/or parsed segments may be stored back in the call segment recordings 340 by the call segment storage module 330 and retrieved and forwarded to the next call participant.

According to one example embodiment of the present invention, the call audio processing system 300 may record at least a portion of a voice call and store the voice call in the call segment recordings database 340. The call segment(s) may be a portion of an ongoing call that was recorded due to an identified segment of interest. The portions of the voice call (i.e., segments) may be retrieved via the retrieval module 310, and identified via a processing operation performed by the call segment parsing module 320 that seeks to locate at least one segment of interest based on predetermined criteria. The identified segments of interest may be transmitted to a new call party responsive to a call transfer action performed by one or more of the original call parties. For example, the customer may be transferred to a first call representative to a new call representative (i.e., technician) that can better assist their needs.

The call segment parsing module 320 may identify a segment of interest that is based on one or more keywords spoken during the voice call. The segment of interest may also be based on at least one of a first portion of the voice call and a last portion of the voice call which are both sub-portions of the original portion of the voice call that has been conducted. Other operations performed by the call processing system 300 may include retrieving a data file which includes a plurality of keywords of interest via the retrieval module 310 and transcribing the voice call from digital audio to a text file via the parsing module 320, which also compares the data file to the text file and parses at least one keyword and its neighboring words from the text file and designates the parsed words as the segment of interest. The neighboring words may be set to a default number of 5, 10, 20, etc., to ensure the keywords of interest are identified properly and are shared with the relevant conversation context to assist the listener with understanding the context of the recorded conversation. A recipient of the voice data may be able to invoke his or her own preferences for receiving the keywords of interest and their respective number of neighboring words.

The transmitting or forwarding of the segment of interest to a new party (i.e., technician, manager, etc.) responsive to a call transfer action may include forwarding the one or more segments of interest to a new call party of the voice call, different from any original call parties, prior to connecting any of the original call parties with the new call party. Additionally, the forwarding action may invoke the forwarding of an option to the new call party to accept or reject the segment of interest prior to connecting any of the original call parties with the new call party. This allows the new call participant to decide whether they want to hear portions of the recorded call or not prior to addressing the customer's needs. The option may be presented as a voice option and dial keypad option (i.e., press "1" to accept the pre-recorded audio) or via a user interface window option (i.e., select "yes" or "no"). The segments of interest may only be forwarded to the new call party if predetermined preferences of the new call party allow the segment of interest to be received by the new call party, such as the new party is setup to automatically receive the segments of interest, the new party is not setup to receive the segments of interest, etc. The setup options may be unique to a particular network user identified by a name and/or workstation or phone identification.

According to another example embodiment of the present invention, a call may be established between two or more users of a conference call system. The conference call may be ongoing and certain portions of the call may be recorded and deemed important and/or unimportant for subsequent attendees or post publication purposes. For example, while processing a recorded portion of the conference call to identify at least one segment of interest via the parsing module 320 (i.e., parsing keywords spoken during the call, parsing initial discussion segments, parsing ending discussion segments, etc.), at least one tag of interest may be created to be associated with a third party application. For example, the tag may be a descriptor, pointer and/or other code segment that links the audio segment of interest to a transcribed and/or voice version of the conference call that is likely to be of interest to other individuals accessing the conference call via a third party application. For example, users who subscribe to a RSS feed, a social networking website, SMS services or another third party application, may be configured to receive updates or snippets of an ongoing conference call based on what was identified as being important and in turn shared with the third party applications.

Once the tag(s) of interest are created, the tag may be forwarded to a third party computing device responsive to the identified segment of interest. The tag may then be received and published as a SMS message, a blog entry on a social networking site, etc., so others may receive updates if they are subscribed to receive such information. For example, if a company CEO is in attendance at a conference call, and certain keywords are spoken, such as "estimate", "revenue", "projections", the segment of audio may then be recorded, parsed and published by a tag association that was created and paired with the segment of interest. As a result, the blog entry on a corresponding social networking site may indicate a dollar amount that corresponds to the CEO's statements regarding "revenue" or other relevant keywords.

The tag of interest may be an instant message (IM), a short message service (SMS) message, an e-mail and a rich site summary (RSS) feed, etc. A data file may be used to identify certain keywords of interest which are retrieved from the database 340 via the call segment retrieval module 320. The data file keywords may be used as a basis for comparison to the transcribed text version of the voice call. The data file includes words of interest designated by one or more of the plurality of intended conference call participants. For example, certain conference call participants or intended participants may submit keywords to a master list each of which may be parsed against a transcribed text version of an active conference call. The keywords may have specific tag designations or may be part of a pool of different tags (i.e., RSS feed tag requests, SMS tag requests, social network website tag requests, etc.) needed to satisfy the requests of the conference call recipients. The tag(s) of interest may be a summary of neighboring words spoken when the at least one word of interest was spoken during the conference call. For example, ten words spoken both before and after a keyword is spoken may be included as part of the tagged subject matter to be shared with the third party application.

According to another example embodiment of the present invention, the system 300 of FIG. 3 may record a portion of a conference call and store the portion of the conference call in memory 340 to be processed to identify at least one segment of interest. The identified segment(s) of interest may be added to an existing work order associated with a third party application via the parsing module 320. For example, a network administrator or other support personnel may be operating an active ticket or work order to satisfy an ongoing customer complaint. An active conference call may include words spoken that identify or relate to an ongoing or open ticket. For example, during the course of a conference call, a participant may comment that the network is slow and the performance of the call functions are not operating properly. Another call participant may offer to page a network administrator to join the all and identify the current problem. The network administrator may then be paged and a ticket may be invoked as a new ticket or updated as an outstanding ticket. The spoken problem "slow network" may be identified as part of the transcription, which is then parsed as a segment of interest and added to the work order or ticket via the parsing module 320. The segment(s) of interest may be transmitted to a third party computing device via the call segment stored module 330 operated by the network administrator responsive to the identified segment of interest.

The existing work order may be a known customer complaint ticket that includes at least one description identifying the customer complaint. For example, the customer complaint may be a ticket that has metadata or descriptors (e.g., "computer", "network", "bandwidth", etc.) that identify the type of problem being experienced. The transcribed conference call segment may be compared and matched as at least one word included in the segment of interest to at least one word used to identify the known customer complaint. The word used to identify the known customer complaint may be included in a summary field of the known customer complaint. Forwarding the segment of interest to the third party computing device may include transferring an update message to a technician's computing device that includes at least a portion of the segment of interest, which may be based on one or more keywords spoken during the conference call. The segment of interest is based on at least one of a first portion of the conference call and a last portion of the conference call, where both the first portion of the conference call and the last portion of the conference call are sub-portions of the portion of the conference call.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 4A:
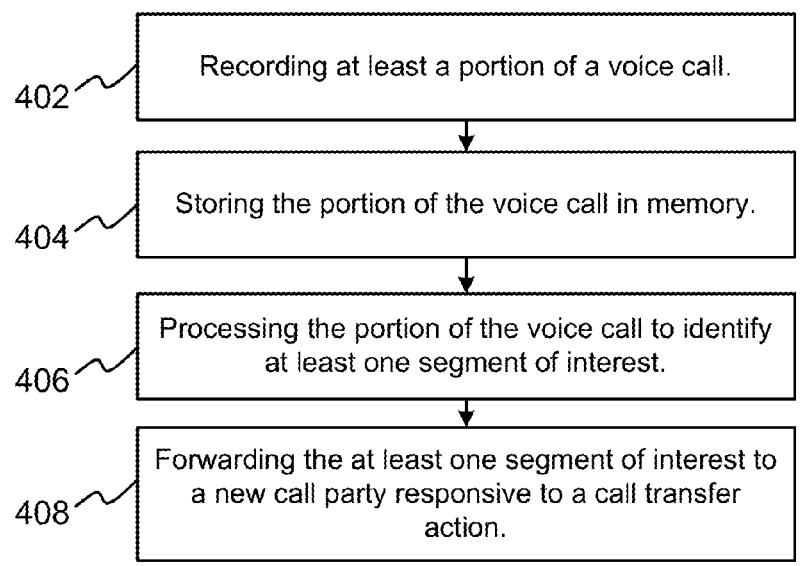
FIGS. 4A-4C illustrate flow diagrams of example methods of operation.

FIG. 4A illustrates an example method of operation according to example embodiments. Referring to FIG. 4, flow diagram 400 includes recording at least a portion of a voice call at operation 402 and storing the portion of the voice call in memory at operation 404. The method also includes processing the portion of the voice call to identify at least one segment of interest at operation 406 and forwarding the at least one segment of interest to a new call party responsive to a call transfer action at operation 408.

Figure 4B:
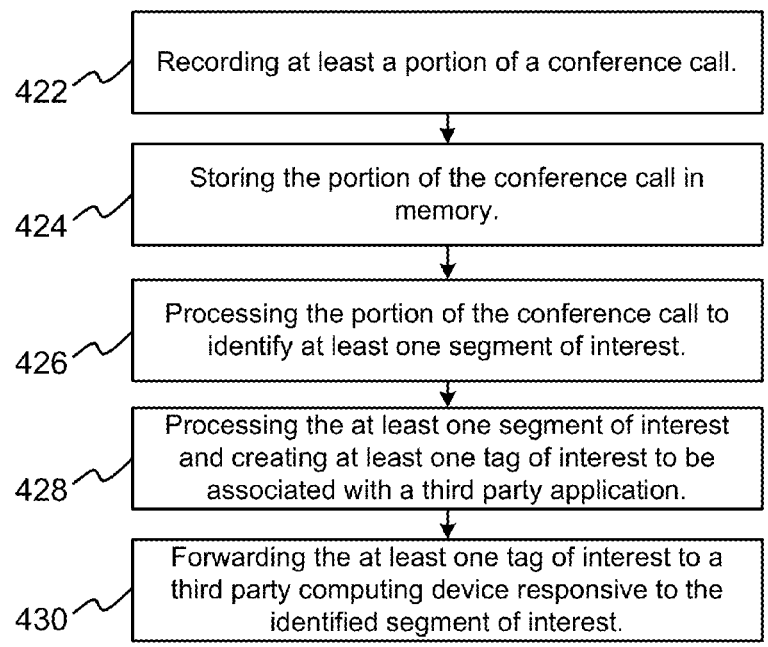

FIG. 4B illustrates another example method of operation according to example embodiments. Referring to FIG. 4B, flow diagram 420 includes recording at least a portion of a voice call at operation 422 and storing the portion of the voice call in memory at operation 424. The method also includes processing the portion of the voice call to identify at least one segment of interest at operation 426 and processing the at least one segment of interest and creating at least one tag of interest to be associated with a third party application at operation 428. The method also includes forwarding the at least one tag of interest to a third party computing device responsive to the identified segment of interest at operation 430.

Figure 4C:
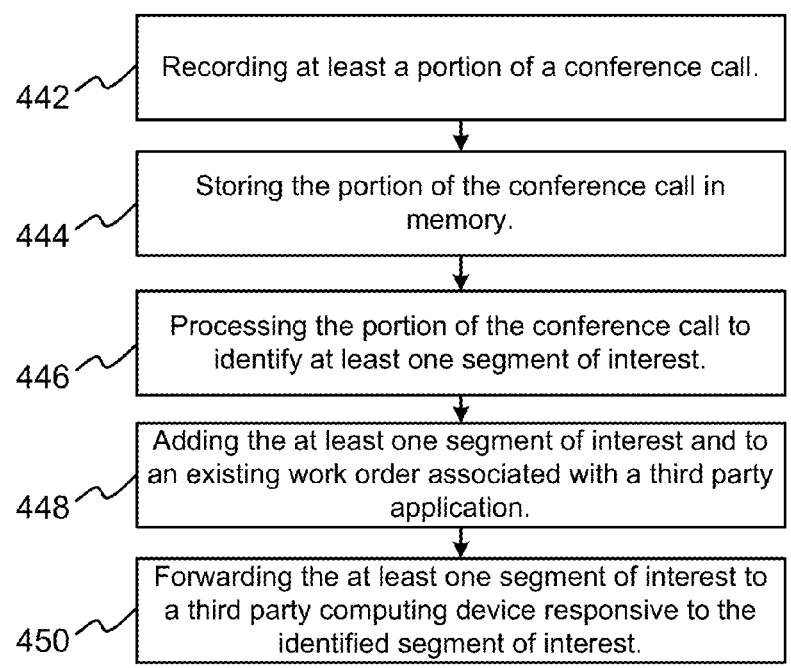

FIG. 4C illustrates yet another example method of operation according to example embodiments. Referring to FIG. 4C, flow diagram 440 includes recording at least a portion of a voice call at operation 442 and storing the portion of the voice call in memory at operation 444. The method also includes processing the portion of the voice call to identify at least one segment of interest at operation 446, and adding the at least one segment of interest to an existing work order associated with a third party application at operation 448. the method further provides forwarding the at least one segment of interest to a third party computing device responsive to the identified segment of interest at operation 450.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 5 illustrates an example network element 500, which may represent any of the above-described network components of the other figures.

Figure 5:
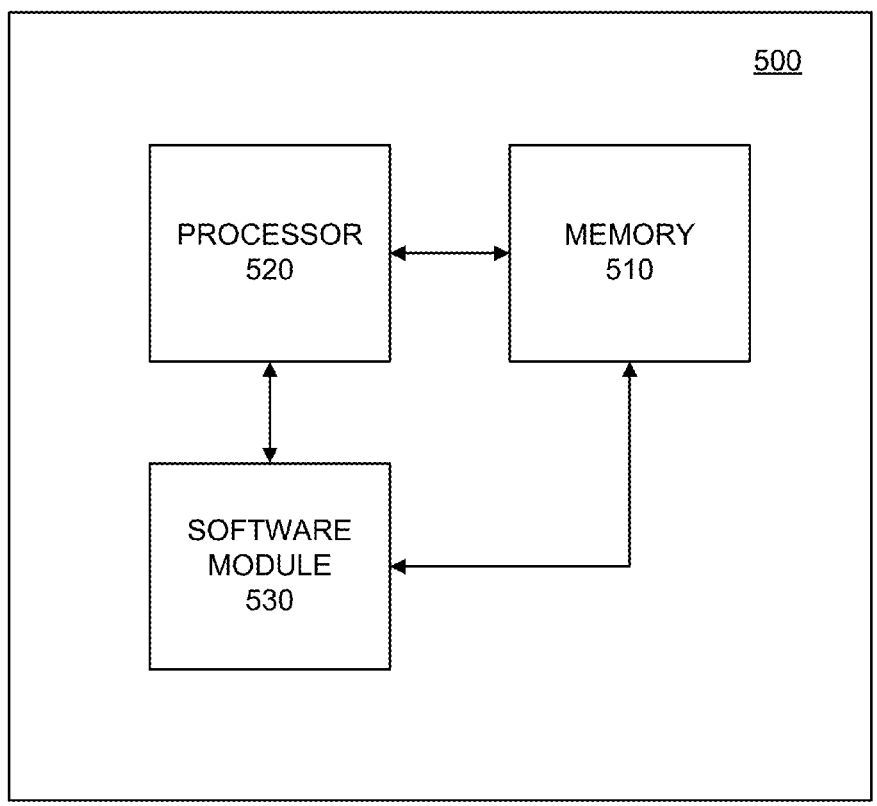
FIG. 5 illustrates a network entity that may include memory, software code and other computer processing hardware used to perform various operations according to example embodiments.

As illustrated in FIG. 5, a memory 510 and a processor 520 may be discrete components of the network entity 500 that are used to execute an application or set of operations. The application may be coded in software in a computer language understood by the processor 520, and stored in a computer readable medium, such as, the memory 510. Furthermore, a software module 530 may be another discrete entity that is part of the network entity 500, and which contains software instructions that may be executed by the processor 520. In addition to the above noted components of the network entity 500, the network entity 500 may also have a transmitter and receiver pair configured to receive and transmit communication signals (not shown).

Although an exemplary embodiment of the system, method, and non-transitory computer readable medium of the present application has been illustrated in the accompanied drawings and described in the foregoing detailed description, it will be understood that the present invention is not limited to the embodiments disclosed, but is capable of numerous rearrangements, modifications, and substitutions without departing from the spirit or scope of the invention as set forth and defined by the following claims. For example, the capabilities of the system illustrated in FIG. 3 may be performed by one or more of the modules or components described herein or in a distributed architecture. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method comprising:
    recording at least a portion of a conference call;
    storing the portion of the conference call in memory;
    processing the portion of the conference call to identify at least one segment of interest;
    creating at least one tag linking the at least one segment of interest to a third party application, wherein the at least one tag comprises at least one publication message format that identifies a published version of audio associated with the segment of interest;
    adding the at least one segment of interest to an existing work order associated with a third party application, wherein the existing work order is a known customer complaint ticket that includes at least one description identifying the customer complaint; and
    forwarding the at least one segment of interest identified at least one tag to a third party computing device.

2. The method of claim 1, further comprising:
    matching at least one word included in the segment of interest to at least one word used to identify the known customer complaint.

3. The method of claim 2, wherein the at least one word use to identify the known customer complaint is included in a summary field of the known customer complaint.

4. The method of claim 1, wherein the forwarding the at least one segment of interest to the third party computing device comprises transferring an update message to a technician's computing device that includes at least a portion of the segment of interest.

5. The method of claim 1, wherein the segment of interest is based on one or more keywords spoken during the conference call.

6. The method of claim 1, wherein the segment of interest is based on at least one of a first portion of the conference call and a last portion of the conference call both the first portion of the conference call and the last portion of the conference call being sub-portions of the portion of the conference call.

7. An apparatus comprising:
  a memory configured to store at least a portion of a conference call;
  a processor configured to
    process the portion of the conference call to identify at least one segment of interest,
    create at least one tag linking the at least one segment of interest to a third party application, wherein the at least one tag comprises at least one publication message format that identifies a published version of audio associated with the segment of interest,
    add the at least one segment of interest to an existing work order associated with a third party application, wherein the existing work order is a known customer complaint ticket that includes at least one description identifying the customer complaint; and
  a transmitter configured to transmit the at least one segment of interest identified by the at least one tag to a third party computing device.

8. The apparatus of claim 7, wherein the processor is further configured to match at least one word included in the segment of interest to at least one word used to identify the known customer complaint.

9. The apparatus of claim 8, wherein the at least one word use to identify the known customer complaint is included in a summary field of the known customer complaint.

10. The apparatus of claim 7, wherein the transmitter transmits the at least one segment of interest to the third party computing device to include an update message transmitted to the computing device that includes at least a portion of the segment of interest.

11. The apparatus of claim 7, wherein the segment of interest is based on one or more keywords spoken during the conference call.

12. The apparatus of claim 7, wherein the segment of interest is based on at least one of a first portion of the conference call and a last portion of the conference call both the first portion of the conference call and the last portion of the conference call being sub-portions of the portion of the conference call.

13. A non-transitory computer readable storage medium configured to store instructions that when executed cause a processor to perform:
  recording at least a portion of a conference call;
  storing the portion of the conference call in memory;
  processing the portion of the conference call to identify at least one segment of interest;
  creating at least one tag linking the at least one segment of interest to a third party application, wherein the at least one tag comprises at least one publication message format that identifies a published version of audio associated with the segment of interest;
  adding the at least one segment of interest to an existing work order associated with a third party application, wherein the existing work order is a known customer complaint ticket that includes at least one description identifying the customer complaint; and
  forwarding the at least one segment of interest identified by the at least one tag to a third party computing device.

14. The non-transitory computer readable storage medium of claim 13, wherein the processor is further configured to perform:
  matching at least one word included in the segment of interest to at least one word used to identify the known customer complaint.

15. The non-transitory computer readable storage medium of claim 14, wherein the at least one word use to identify the known customer complaint is included in a summary field of the known customer complaint.

16. The non-transitory computer readable storage medium of claim 13, wherein the forwarding the at least one segment of interest to the third party computing device comprises transferring an update message to a technician's computing device that includes at least a portion of the segment of interest.

17. The non-transitory computer readable storage medium of claim 13, wherein the segment of interest is based on one or more keywords spoken during the conference call, and wherein the segment of interest is based on at least one of a first portion of the conference call and a last portion of the conference call both the first portion of the conference call and the last portion of the conference call being sub-portions of the portion of the conference call.

* * * * *